April 21, 1953     A. M. CONCELLO     2,635,889
PORTABLE SEATING STRUCTURE

Filed Dec. 3, 1947     2 SHEETS—SHEET 1

INVENTOR.
ARTHUR M. CONCELLO
BY
Jerome W. Paxton
Agent

April 21, 1953     A. M. CONCELLO     2,635,889
PORTABLE SEATING STRUCTURE

Filed Dec. 3, 1947     2 SHEETS—SHEET 2

INVENTOR.
ARTHUR M. CONCELLO
BY
Jerome W. Paxton
Agent

Patented Apr. 21, 1953

2,635,889

UNITED STATES PATENT OFFICE 2,635,889

PORTABLE SEATING STRUCTURE

Arthur M. Concello, Bloomington, Ill.

Application December 3, 1947, Serial No. 789,371

11 Claims. (Cl. 280—30)

The present invention relates to seating arrangements, and more particularly has reference to a portable collapsible platform structure finding the special use for supporting seats for circuses and other similar performances.

It is, of course, well known that considerable time and expense is involved in setting up and demounting seating structures for performances of a limited duration such as circuses, carnivals and various types of sporting events. Most structures employed for spectacles of this nature have included wooden frames mounted above the ground or arena, provided with chairs or other types of seats. This type of seating structure requires considerable working parts and by virtue thereof consumes considerable space in transport which is undesirable. In addition, crews of substantial size must be employed to correctly set up the seating structure, with the attendant high expense.

Attempts have been made to provide a portable type seating arrangement for performances of this type but these units have been too complex in structural details to warrant their widespread use.

Accordingly, an object of my invention is to provide a portable seating structure of the character described which overcomes the above and other characteristics now present in the art.

A further object of this invention is to provide a highly mobile trailer type vehicle which may be readily and easily converted, with a minimum of skilled help, into a supporting structure for seats or the like.

And another object of my invention is to provide a portable collapsible seating structure which is carried by a trailer-like body which, when in its operative position, is so arranged that the patrons may readily see the performance above the heads of the persons in the preceding row.

Yet a further object of my invention is to provide a seating structure of the type described, wherein the supporting surface includes means for detachably connecting a chair or the like thereto.

Still a further object of my invention is to provide a portable collapsible seating structure forming an integral part of a mobile trailer which is simple in structural detail, positive in operation and which can be relatively inexpensively manufactured.

To accomplish the above and other important objects, the invention broadly includes a wheeled frame, the sides, top and one end of which are adapted to form the supporting surface for the seats. The sides of the vehicle are hingedly mounted to the top, and the top in turn is pivotally connected to the front supports of the vehicle. The opposite or rear end of the vehicle is hinged to supporting beams which extend downwardly from the upper front end of the frame to a position adjacent the rear supporting wheels. When it is desired to erect or set up the seating structure, the rear closure is opened and the side members are then moved upwardly about their point of pivoting to the top closure. This enables the top closure to be moved downwardly until it contacts the inclined support which is at such an angle as to provide excellent vision for the seats which are secured thereto. Suitable supporting struts or the like are then attached to the respective side walls to hold such side walls in proper alinement with respect to the top wall. The chairs or other type seats are then securely fastened to lugs or the like provided on the exposed surface of the supporting structure.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which.

Figure 2:
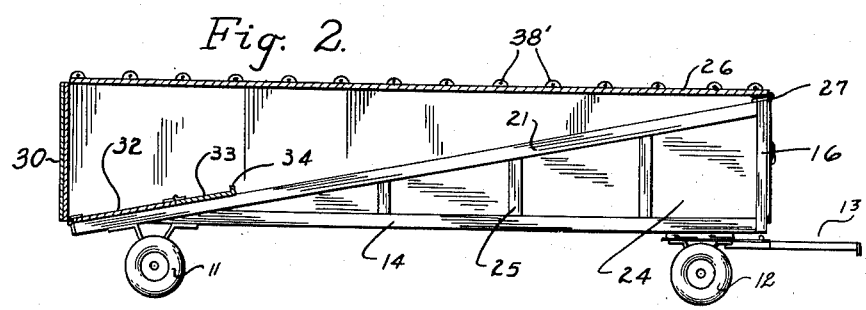
Figure 2 is a vertical sectional view of the trailer shown in Figure 1.

Referring to the drawings, and more particularly to Figure 2, I have shown a mobile trailer 10 having supporting wheel assemblies 11 and 12, respectively, the wheels 12 being the front wheels of the vehicle. The wheel assembly 12 may be provided with a tongue or other type connector 13 for attaching the trailer to a power driven vehicle of any convenient type.

Mounted upon and secured to the wheel assemblies 11 and 12 are a pair of parallel longitudinally extending metal channel bars 14 forming the frame of the vehicle. The front ends of the channel bars 14 are connected by a cross beam 15 to each end of which is attached a vertical post 16. A second cross beam 17 extends between the posts at the upper ends thereof. The space between the posts 16 and the beams 15 and 17 is closed by a pair of outwardly swinging doors 18, each of which is hinged to the respective post 16, as shown at 19. A conventional latch structure 20 may be used to maintain the doors in a locked position. As best shown in Figure 2, a pair of spaced parallel channels 21 are secured at their upper ends to the posts 16 and incline downwardly to the rear wheel assembly 11, and the channels are secured to the wheel assembly in any suitable manner. As shown in Figure 2, the lower ends of the channels extend a short distance beyond the rear wheels. A sheet metal floor 22 provided with reinforcing members 23 is secured to the channels 14 of the frame, and metallic side walls 24 have their upper ends attached to the inclined channels 21 and the lower ends to the channel members 14. To strengthen the side walls, a plurality of vertical supports 25 extend between the channels 14 and 21 and may be secured to the side walls 24 by bolts, rivets, or the like.

A platform or wall 26 forms the upper closure of the vehicle and is pivoted along its front edge to the upper end of the beam 17, as shown at 27. The platform is of such width as to extend between the vertical posts and the length is such as to extend from the front of the vehicle to the rearmost ends of the channels. A side platform or wall 28 is hingedly mounted as at 29 along each longitudinal edge of the wall and is of substantially the same dimensions as the wall 26. The platforms 28 function as the side walls of the vehicle.

Figure 6:
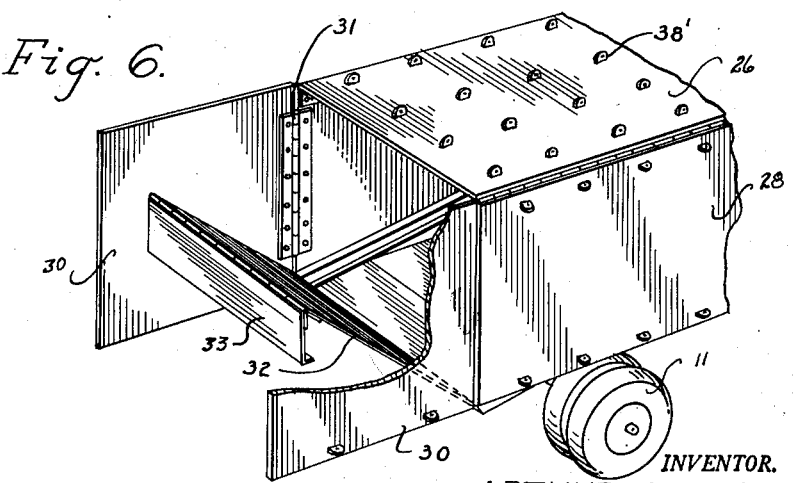
Figure 6 is a fragmental view in perspective illustrating the rear end of the vehicle, one of the doors being broken away.

Referring to Figures 2 and 6, it will be noted that the rear edge of each wall 28 is provided with an extension 30 which is hinged thereto as shown at 31. The extensions are of a height and breadth sufficient to close the rear end of the trailer when they are moved inwardly about their pivots and the hinges are so arranged that the extensions will overlap in the closed position. A ramp-like member 32 is pivoted to the floor adjacent the rear end of the frame and an extension 33 having a flange 34 along the front edge thereof is hinged to the free end of the ramp. Normally the member 32 is located within the vehicle and is supported by the inclined channels 21.

Figure 3:
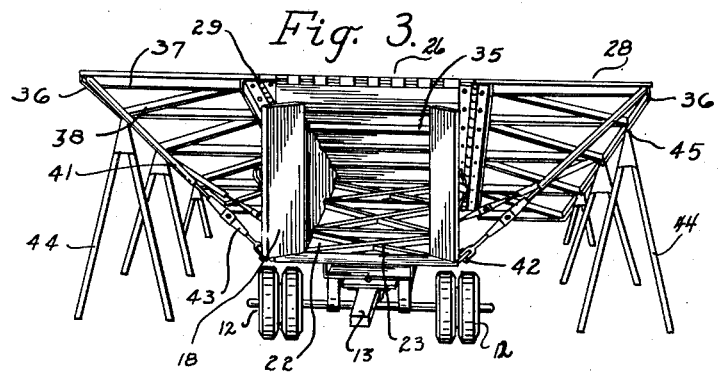
Figure 3 is a rear view showing the supporting surface in its erected position, with the doors of the mobile trailer being opened.

As perhaps best shown in Figure 3, the lower face of the platform or upper wall 26 is strengthened by the transversely extending beams 35. Each side wall 28 has suitably affixed to the free transverse and longitudinal edges, channel bars 36. Extending from the hinges 29 to the channels 36 are a plurality of lateral braces 37 and diagonal braces 38. In view of the fact that the side platforms 28 are under greater strain than the top platform 26, it has been determined that these particular strengthening members are necessary.

The upper surface of the platform 26 carries a plurality of apertured lugs or extensions 38' which may be secured to the platform in any desirable manner. The lugs 38' are arranged in alined rows extending from the front edge of the platform to the rear edge thereof and while I have illustrated four such lugs being provided in the transversely extending row, it is, of course, to be understood that a greater or less number may be employed, depending upon the dimensions of the platform. Collapsible chairs designated generally 39 are adapted to have the front legs thereof positioned between the lugs 38', and a tie rod or the like 39' is inserted through the apertures in the lugs and similar apertures in the legs of the chairs for securely fastening the chairs to the platform 26. Preferably, a single tie rod is used for each transverse row of lugs. As far as the side walls or platforms 28 are concerned, a plurality of similar lugs 40 extend longitudinally of these platforms adjacent the edges thereof and the lugs 40 are, of course, in alinement with the lugs 38' on the top platform 26. The chairs mounted on the side platforms are secured to the lugs 40 in the same manner as the chairs 39.

When it is desired to erect the seating structure, the extensions 30 of the side platforms 28 are moved outwardly about their pivots 31, whereby the extensions will be in longitudinal alinement with the side platforms 28. The crew members elevate the side platforms 28 and the extensions 30 upwardly about the hinges 29 until the upper surface of the respective platforms is flush with the upper surface of the top platform 26. Telescoping braces of conventional design designated 41 have their lower ends connected to angle brackets 42 provided at spaced intervals along the channel bars 14 and the upper ends may extend through spaced openings formed in the longitudinally extending channels 36 along the free edges of the platforms 28. Each brace 41 includes an adjusting device 43 for lengthening or shortening the brace 41 as desired. For most purposes, I have determined that two such supporting braces are sufficient for most operating conditions encountered, although additional braces may be used, should the situation warrant for the bracing. To stabilize the free longitudinal edge of each of the side platforms 28, supporting bipods designated 44 may be employed. As shown in Figure 3, the upper end of each bipod is provided with a furcation or the like 45 which receives the vertical flange of the channel 36. The bipods are of varying heights and are spaced at suitable intervals along the free edge of each platform when the supporting structure is set up, as will later be more fully described.

Figure 4:
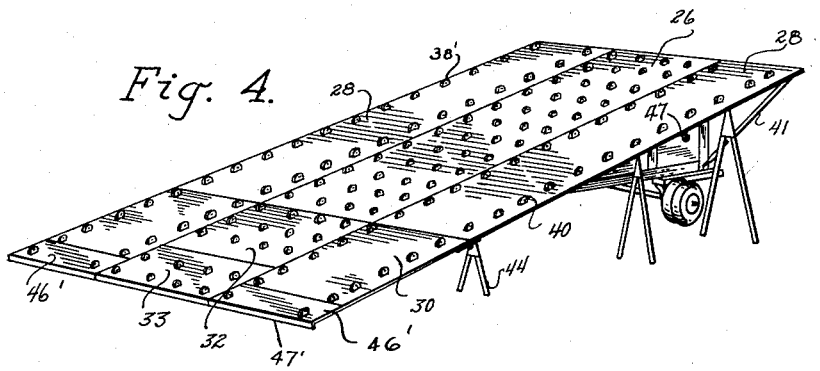
Figure 4 is a perspective view showing the supporting structure for the seats in its erected position.
Figure 5:
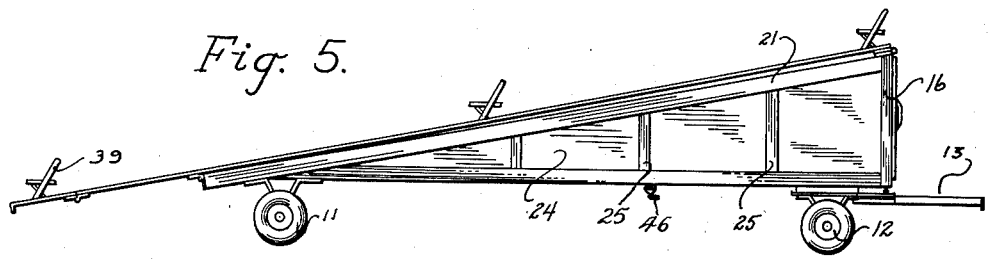
Figure 5 is a view in side elevation of the arrangement shown in Figure 4, but with the supporting struts being removed.

After the side platforms 28 have been properly elevated, the ramp 32 is moved outwardly and downwardly about its pivot to the vehicle until it contacts the ground or other supporting surface. The top platform 26 and the side platforms 28 are then moved downwardly about the pivot point 27 of the platform 26 until the platform 26 rests upon the inclined channels 21. At this time, the supporting braces 41 and the bipods 44 are placed in position and the platforms 26 and 28 will then assume the inclined position, as illustrated in Figure 4. Hence, we have a continuous, rigid, well-supported seat supporting surface which is disposed at such an angle with respect to the arena as to provide excellent vision. By reference to Figure 4, it will be observed that the ramp 32 in conjunction with its extension 33 is of slightly greater length than the extensions 30 hinged to the platforms 28. To compensate for this difference in length, an extension 46' may be suitably attached to the free end of each extension 30 and a downwardly turned flange 47' extends along the front edge of the extension 46'. After the platforms have been raised to the position shown in Figures 4 and 5, the chairs 39 are then secured to the lugs 38' and 40 in the manner previously described.

It is thought readily apparent in view of the foregoing that I have provided a portable seating arrangement for use at circuses, sporting events and the like, which may be readily and easily erected with a minimum of help. The seats are detachably connected to the supporting surface in a simple manner and are so secured to the supporting platforms that there is no danger of the seats overturning.

When it is desired to disassemble the supporting surface, the process of assembly is simply reversed and no further description is deemed necessary. The bipods and supporting braces when not in use may be conveniently stored within the body of the trailer and the interior thereof is also of sufficient size to enable the majority, if not all, of the chairs 39 to be carried therein.

Figure 1:
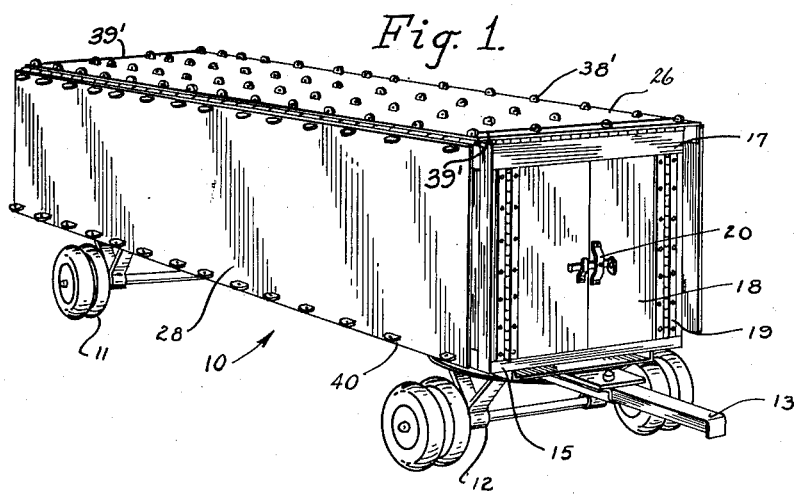
Figure 1 is a view in perspective of a mobile trailer constructed in accordance with my invention.

When the side walls are moved downwardly about their pivots as shown in Figure 1, these members may be detachably secured to the sides of the trailer by means of one or more hooks or the like 46 extending along the channels 14 which engage one or more eyes 47 attached to the channels 36 of the side platforms 28.

While the present invention is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. A portable seating structure having a top wall and side walls comprising supporting wheels, spaced parallel longitudinal supporting members attached to said supporting wheels, a transversely extending horizontal support connecting one end of said longitudinally extending members, a vertical post secured to each end of said horizontal support, a second transversely extending horizontal support attached to the upper ends of said vertical post, a top member pivoted at one end to said second named horizontal support, a side member hinged to each side of the top member thereby forming the top and side walls of the structure, the said side members being adapted to be moved about their hinges to aline said side members with the top member, inclined longitudinally extending supports secured to the second named horizontally extending support at one end and attached to the supporting wheels at the opposite end whereby said top and side members may be supported thereby for maintaining said members in an inclined position, and struts engaging said side members to hold said side members in alinement with the top member.

2. A portable seating structure having a top wall and side walls comprising supporting wheels, spaced parallel longitudinal supporting members attached to said supporting wheels, a transversely extending horizontal support connecting one end of said longitudinally extending members, a vertical post secured to each end of said horizontal support, a second transversely extending horizontal support attached to the upper ends of said vertical post, a top member pivoted at one end to said second named horizontal support, a side member hinged to each side of the top member thereby forming the top and side walls of the structure, the said side members being adapted to be moved about their hinges to aline said side members with the top member, inclined longitudinally extending supports secured to the second named horizontally extending support at one end and attached to the supporting wheels at the opposite end whereby said top and side members may be supported thereby for maintaining said members in an inclined position, and adjustable diagonal braces secured at one end to the side members and at the opposite end to the longitudinally extending members for holding said side members in alinement with the top member.

3. A combined mobile vehicle and portable seating structure comprising a wheeled frame, an enclosure supported by said frame including a top wall and side walls, means pivotally connecting one end of said top wall to the frame for movement about a horizontal axis, further means pivotally connecting the side walls to the longitudinal edges of the top wall for movement about a horizontal axis whereby the side walls may be moved about their pivots for alinement with the top wall to provide a planar supporting surface, means cooperating with said side walls and frame to maintain said side walls in alinement with said top wall, and supporting means on said frame to support said top wall and alined side walls in an inclined position with respect to the frame.

4. A combined mobile vehicle and portable seating structure as defined in and claimed by claim 3 wherein said supporting means includes spaced inclined supports extending longitudinally of the frame for supporting the top wall.

5. A combined mobile vehicle and portable seating structure as defined in and claimed by claim 3 wherein the means for maintaining said side walls in alinement with the top wall includes adjustable diagonal braces operatively connected to the side walls and to the frame.

6. A combined mobile vehicle and portable seating structure as defined in and claimed by claim 3 further characterized in that said top and side walls are provided with alined apertured lugs, and securing means cooperating with the lugs to detachably connect seating structures to the top and side walls.

7. A combined mobile vehicle and portable seating structure as defined in and claimed by claim 3 further characterized in that complemental means are carried by the frame and said side walls to secure said side walls to the frame when the side walls are moved downwardly about their pivots to define the side walls of the vehicle.

8. A combined mobile vehicle and portable seating structure as defined in and claimed by claim 3 further characterized in that ground contacting bipods are adapted to engage the free edge of each of said side walls to further support said side walls when said walls are in alinement with the top wall.

9. A combined mobile vehicle and portable seating structure comprising a wheeled frame including a vertical end wall, side walls, a top wall pivotally connected to the end wall for movement about a horizontal axis, inclined supports extending longitudinally of the frame adapted to support the top wall at an angle to the frame to provide an inclined ramp, means to connect seating structures to the top wall, and further means to support said top wall at substantially right angles to the end wall.

10. A combined mobile vehicle and portable seating structure as defined and claimed by claim 9, further characterized in that a side platform is pivotally connected to each longitudinal edge of the top wall for pivotal movement about a horizontal axis, said side platforms normally being supported in parallel relation to the side walls of the frame but being adapted to be moved about their pivots to aline the side platforms with the top wall, and means operatively connected with the side platforms and the frame to maintain the side platforms in alinement with the top wall.

11. A combined mobile vehicle and portable seating structure as defined in and claimed by claim 10, further characterized in that each of said side platforms is provided with means to maintain said top wall at substantially right angles to the end wall.

ARTHUR M. CONCELLO.

References Cited in the file of this patent

UNITED STATES PATENTS

| Number | Name | Date |
|---|---|---|
| 458,847 | Tracy | Sept. 22, 1891 |
| 683,828 | Winans | Oct. 1, 1901 |
| 1,060,418 | Beach et al. | Apr. 29, 1913 |
| 1,301,107 | Curtis | Apr. 22, 1919 |
| 1,521,803 | Dossenbach | Jan. 6, 1925 |
| 2,136,130 | Gorlenko | Nov. 8, 1938 |

FOREIGN PATENTS

| Number | Country | Date |
|---|---|---|
| 129,057 | Great Britain | July 2, 1919 |
| 851,872 | France | Oct. 9, 1939 |